Dec. 12, 1967   J. E. CORNETT   3,357,177
GAS TURBINE ENGINE FUEL CONTROL SYSTEM
Filed June 2, 1966
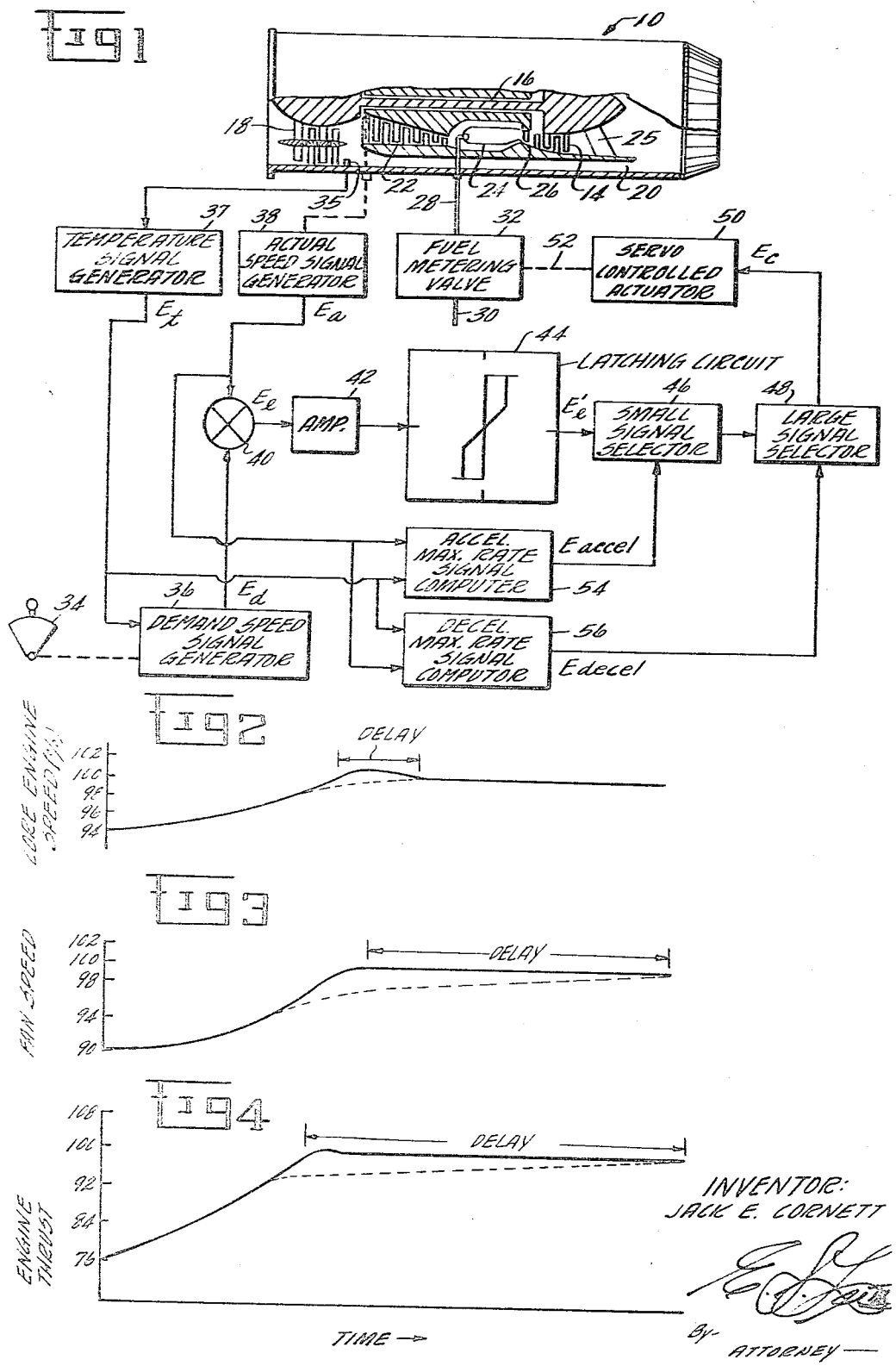
INVENTOR:
JACK E. CORNETT
BY ATTORNEY

United States Patent Office 3,357,177
Patented Dec. 12, 1967

3,357,177
GAS TURBINE ENGINE FUEL CONTROL SYSTEM
Jack E. Cornett, Cincinnati, Ohio, assignor to General Electric Company, a corporation of New York
Filed June 2, 1966, Ser. No. 554,838
5 Claims. (Cl. 60—39.28)

The present invention relates to improvements in engine controls and more particularly to improved fuel controls for gas turbine engines.

In controlling operation of gas turbine engines, it is common practice to establish a speed demand signal, usually reflecting the position of a pilot controlled lever. This demand signal is compared with a signal indicating the actual speed of the engine as measured by the rate of rotation of its rotor. If these two signals are equal, the engine speed is at the desired speed. If not, an error signal results which is utilized to either increase or decrease fuel flow in order to obtain the desired speed, and in so doing, to null out the error signal. In this manner the thrust of the engine is maintained at a desired level.

Such systems can include many other control parameters and refinements. Thus, for example, where a large increase in speed in desired, it is an accepted practice to schedule fuel flow at a maximum rate which is consistent with safe operation of the engine, such maximum rate being maintained irrespective of and so long as the speed/error signal is above a given value. However, as engine speed approaches the desired speed, the error signal becomes smaller and while sufficient fuel is fed to the engine to continue acceleration, the rate of acceleration progressively decreases as the desired speed is approached. This is true in both non-integrating and integrating types of controls, integrating types of controls having reference to the provision of means for changing the rate of fuel flow so long as an error signal exists. The latter type of control is, generally speaking, superior in minimizing acceleration time, as well as accurately maintaining a desired speed, and in maintaining stability of operation at the desired speed.

The inherent operation of such controls results in a finite delay in attaining desired speed as the maximum fuel flow change schedule is departed from in order to gradually bring the engine to a desired speed in a stable fashion. While this delay time is relatively short and the additional speed change to be attained is relatively small, nonetheless, there are many instances where the thrust differential potentially available could be a significant factor in the operation of an aircraft propelled by the engine.

Such delay is of greater significance in turbofan engines which comprise a so-called core engine which generates a hot gas stream for driving a turbine and a fan connected thereto. The fan discharges a stream of "bypass" air through a nozzle to provide as much as 85% of the thrust of the engine. The speed, and thrust, of the fan is a function of the rate of the core engine. Changes in fan thrust are obtained by changing fuel flow to the core engine. Due to the fluid connection between the core engine rotor and the fan there is an inherent lag time between core engine reaching a desired speed and fan speed attaining its corresponding speed. Beyond this normal lag time a delay of, say, 2 seconds in arriving at full core engine speed could result in as much as a tenfold delay in attaining desired fan speed. It is thus of great importance in fan type engines that acceleration and deceleration times, of the gas turbine "core" engine, in arriving at a desired speed be minimized in order that the correct thrust output of the engine be available as soon as possible for safe and effective operation of an aircraft.

Accordingly, it is the object of the invention to minimize the time required to change the rate of operation of a gas turbine engine from one speed to another and to do so in a manner enabling safe, effective, and reliable operation of the engine.

Another object of the invention is to provide a control system which is particularly effective in rapidly providing desired thrust levels from turbofan engines.

Another object of the invention is to attain the above ends in a simple and economical manner.

The invention may be incorporated in a control system for a gas turbine engine of the type above referred to. Such control systems comprise means for generating a signal reflecting a desired speed and means for generating a signal reflecting the actual speed of the engine. These signals are compared by means from which is derived an error signal. This error signal, when below a given value, is applied to means for controlling fuel flow to the engine. For small deviations in the actual speed from a desired speed and hence a small error signal, the rate of fuel flow can be varied as a direct function of the magnitude of the error signal. However, where the desired speed is substantially more or less than the actual speed, other parameters control the rate of change in fuel flow in order to prevent engine compressor stall, overtemperaturing and other harmful effects. Various inputs, such as engine speed compressor pressure ratio, and air inlet temperature may be fed to a computer which is scheduled, from empirical data, to provide an output signal that will vary fuel at the maximum rate consistent with safe operation of the engine.

The maximum rate signal controls fuel upon the magnitude of the speed error reaching a given value. In accordance with the present invention the maximum rate signal continues to control fuel flow until the speed of the engine approximates desired speed. The maximum rate signal is then removed as the fuel flow control means. Thereupon control of fuel flow reverts to being a function of the speed error signal. The engine rotor has an inertia which will cause it to "overshoot" the desired speed so that in case of an acceleration, the speed error signal will then call for a reduction of fuel flow which will be progressively arrived at over the normal delay time which enables stable operation of the engine at the desired speed.

The preceding reference to engine speed being the control parameter should be understood to denote that speed is an indirect measurement of thrust and that other thrust parameters could be employed in controlling engine operation to minimize the time obtaining thrust changes.

The above and other related objects and features of the invention will be apparent from a reading of the following description of the disclosure found in the accompanying drawing and the novelty thereof pointed out in the appended claims.

In the drawing:

FIGURE 1 is a diagrammatic illustration of a fuel control system embodying the present invention;

FIGURES 2, 3, and 4 are plots illustrating the manner in which an engine is accelerated by the control means of FIGURE 1.

FIGURE 1 illustrates an engine 10 of the so-called turbofan type. Such engines comprise a core engine 12 which generates a hot gas stream for driving a fan turbine 14 which is connected by a central shaft 16 to a fan rotor 18. The fan rotor 18 functions as a low pressure compressor to discharge an annular stream of air through a nozzle 20 to provide the major portion of the thrust of the engine. The fan 18 also pressurizes air which is supplied to the core engine 12. The latter comprises a high pressure compressor 22, a combustor 24, and a turbine 26, which drives the compressor 22.

While there are many control functions involved in the operation of this engine, the rotational speed of the core engine rotor is the primary factor in generating an output thrust from the fan as well as from a central discharge exit nozzle 25 for the hot gas stream generated by the core engine. This is to say that the faster the core engine rotor rotates, the higher the energy level of the gas stream which is generated. This factor in turn is a function of the rate of combustion of fuel in combustor 24.

The combustor comprises a series of nozzles (only one is shown) to which fuel is delivered by way of a conduit 28 from a pressurized fuel supply conduit 30. The rate of fuel flow through the conduit 28 is controlled by a metering valve 32, a function of the position of its metering piston (not shown).

The speed of the engine 10 is usually controlled by pilot manipulation of a throttle lever 34 to obtain a desired thrust. The throttle lever is connected to a demand signal generator 36 which functions as a transducer to convert the angular position of the lever 34 to an output voltage signal $E_d$, the value of which reflects a desired speed. For convenience of description it will be assumed that all voltage signals herein referred to are direct current signals.

The demand signal $E_d$ is also modified as a function of the temperature of the air entering the core engine 12. This temperature is measured by a sensor 35, as for example, a thermocouple, the output of which is connected to a temperature signal generator 37 which will provide an output signal $E_t$ of appropriate strength, reflecting the engine inlet air temperature. The signal $E_t$ is provided as an input to the demand speed signal generator 36, in order that the demand signal $E_d$ properly reflects a desired thrust level since thrust output is affected by changes in the inlet air temperature.

An actual speed signal generator 38 is mechanically or electrically connected to the core engine rotor and generates an output signal $E_a$ reflecting the actual speed of the core engine rotor. The signals $E_d$ and $E_a$ are fed to a summing device 40 which produces a resultant error signal $E_e$. This error signal may then be amplified by an amplifier 42 and fed to a latching circuit 44 which functions in a manner more fully described hereinafter. However, for the moment let it be assumed that the latching circuit functions simply as a one to one amplifier providing a signal $E'_e$ which is fed to selector circuits 46, 48. Dependent upon the polarity of the signal $E'_e$, it will pass from the first selector circuit 46 to the second selector circuit 48 and then to a servo controlled actuator 50 as a control signal $E_c$. The actuator 50 provides a mechanical output indicated at 52 for positioning the metering valve 32. The servo control is preferably of the integrating type so that the mechanical output 52 will continue to be displaced so long as a control signal $E_c$ is fed thereto.

The preceding covers normal operation of the engine control where the actual speed of the engine is close to the desired speed, as in trimming an engine to a desired speed and thrust. When a large change in engine speed is desired, provision is made for displacing the metering valve 32 at a maximum rate consistent with safe operation of the engine.

To this end an acceleration maximum rate signal computer 54 and a deceleration maximum rate signal computer 56 are provided.

The computers 54 and 56 are provided with actual speed signal inputs $E_a$ and engine inlet air temperature signal inputs $E_t$. With these inputs the computers are scheduled from empirically derived data to provide output signals $E_{accel}$ and $E_{decel}$, which signals if applied to the servo controlled actuator 50 as the input $E_c$ would cause the fuel metering valve to be displaced to provide the maximum rate of change in fuel flow consistent with safe operation of the engine 10.

Referring back to the latching circuit 44, it will be noted that it serves as a function generator. That is, its output, $E'_e$, is not a simple amplification of any input thereto. Whenever the amplified error signal $E_e$ is below a given value, it does function as a one to one amplifier wherein the output $E'_e$ is of the same magnitude and polarity as the input. However, when the amplified input to the circuit 44 exceeds a given value, the output is immediately raised to a significantly higher value. Considered as an amplifier, it is immediately driven to saturation with a maximum value $E'_e$ for its output. This holds true for both positive and negative values of the error signal $E_e$ respectively representing a condition of underspeed wherein the engine is to be accelerated and overspeed wherein the engine is to be decelerated. Once the output of the latching circuit is driven to this maximum value, further increases in the magnitude of the error signal $E_e$ have no effect on the output $E'_e$. Also, if the input to the latching circuit drops below the value at which it was driven into saturation, the output $E'_e$ remains constant at its maximum value until the input thereto is reduced to zero. This would indicate a condition wherein no speed error signal existed and the engine was operating at its desired speed. When such condition exists, the output signal $E'_e$ drops immediately to zero and thereafter its output again reverts to a one to one amplification factor of the input until the value required for driving it to a maximum value is again reached.

An electrical circuit capable of generating an output function, as described in connection with circuit 44, is more fully described and claimed in copending U.S. application Serial No. 453,022, filed May 4, 1965, in the name of Richard J. Hellen, which application is assigned to the same assignee as the present application.

A positive signal $E_e$ indicating less than a 2% overspeed condition results in a proportionate positive signal $E'_e$. This signal is fed to the small signal selector 46 and will be less than any maximum acceleration rate signal $E_{accel}$ and therefore pass to the large signal selector 48. Since it is positive as compared to the negative $E_{decel}$ signal, the signal $E'_e$ will become the control signal $E_c$ and pass to the servo controlled actuator 50 causing an increase in fuel flow until the error signal $E_e$ is nulled out. Correspondingly, if the actual speed is greater than the desired speed but less than 2% thereof, the output signal $E'_e$ will be negative and hence smaller than the signal $E_{accel}$. This negative $E'_e$ signal passes to the large signal selector 48, where it will be compared with the negative deceleration rate signal $E_{decel}$. A negative $E'_e$ signal representing overspeed of less than 2% will be more positive than any $E_{decel}$ signal so it will pass from the large signal selector to the servo controlled actuator 50, causing a decrease in fuel flow until the error signal $E_e$ is nulled out.

Let it be assumed next that a substantial thrust increase is desired, requiring a speed increase of greater than 2%. The demand signal will be increased, causing a relatively large error signal to be fed to the latching circuit 44. When this error signal reaches a value indicating a speed error greater than 2%, the output, $E'_e$, of the latching circuit is driven to a maximum positive value. This value will be greater than any maximum acceleration rate signal $E_{accel}$ and therefore, so long as $E'_e$ is at a maximum positive value, the signal $E_{accel}$ will be passed to the large signal selector and then become the control signal $E_c$. The signal $E_{accel}$ then controls operation of the servo controlled actuator 50, causing an increase in fuel flow at a maximum rate consistent with safe operation of the engine. As desired speed is approached, the error signal $E_e$ will be reduced below the value at which the latching circuit 44 was driven to its maximum output. However, as described above, this maximum value $E'_e$ signal is maintained, preferably until the actual speed of the engine reaches the desired speed. At this point the circuit 44 will again act as a one to one amplifier and the output signal $E'_e$ will instantaneously be zero and less than the signal $E_{accel}$. The $E'_e$ signal now passes from the small signal selector 46 to the large signal selector 48 and becomes the control signal $E_c$. Under ordinary circumstances it is to be expected that due to inertia the speed of the engine will exceed the desired speed but by less than the 2% limit for controlling fuel flow as a function of speed error signal. The error signal $E_e$ and the output $E'_e$ become negative with the latter a direct function of the former. Under these conditions there will be a negative signal $E'_e$ which passes from the small signal selector 46 to the large signal selector 48 and becomes the control signal $E_c$. The negative signal $E_c$ functions to progressively reduce the speed of the engine until the slight overspeed condition is corrected, bringing the engine speed to desired speed in a stable fashion.

This mode of operation is illustrated in FIGURES 2–4 which respectively plot core engine speed, fan speed, and overall engine thrust against a common time coordinate. Referring to FIGURE 2, it will be seen that in accelerating from 94% core engine speed, the acceleration rate is maintained at a maximum value until 100% speed is reached. Thereafter, rotor inertia causes an overspeed condition which is corrected by a reduction in fuel flow which progressively brings the engine speed to desired speed in a stable fashion. The dotted line in FIGURE 2 illustrates operation of a normal control wherein the rate of acceleration progressively decreases as desired speed is approached. The distance $x$ represents the delay time between which desired speed is obtained by the described control as compared with conventional controls.

FIGURE 3 illustrates that a 6% acceleration of the core engine speed given a proportionately greater increase in fan speed. Fan speed lags core engine speed and attains maximum speed, usually without and overshoot, at a point after maximum core engine speed is reached. Again in FIGURE 3 the dotted line illustrates the change in fan speed which would be obtained employing conventional systems for accelerating the core engine speed. A distance $y$ represents the saving in time obtainable in reaching desired fan speed.

FIGURE 3 illustrates the change in thrust from the fan type engine 10 resulting from an increase in core engine speed, as above described. It will be noted that a relatively small percentage increase in core engine speed provides a very substantial percentage increase in overall thrust output. Further, when comparing thrust output to what is obtainable with conventional systems again indicated by the dotted line, it will be seen that when maximum thrust is obtainable in accordance with the present invention, there is approximately 95% thrust available in accordance with conventional systems. Further, there is again a substantial time delay represented by distance $z$ before maximum thrust is obtainable from conventional systems.

It is to be understood that the described plots of speed and thrust versus time are representative only and would vary from engine to engine.

Operation of the described circuit is essentially the same where a substantial decrease in speed and thrust output is desired. Thus, when the amplified value of a negative error signal $E_e$ exceeds a given limit, the output of the latching circuit 44 immediately shifts to a maximum negative value. This negative value output passes from the small signal selector to the large signal selector. The maximum negative $E'_e$ signal is always greater in magnitude and therefore smaller than any $E_{decel}$ signal to be generated. Thus, the $E_{decel}$ signal passes to the servo controlled actuator 50 and reduces fuel flow at a maximum rate consistent with safe operation of the engine. Similarly the $E'_e$ signal is maintained at its maximum negative value until a desired, reduced speed is reached and the error signal $E_e$ is at a zero value. At this point the output $E'_e$ again becomes proportional thereto and is passed to the servo controlled actuator 50 by the selectors 46, 48.

The reduced engine speed is arrived in a minimum time and curves reflecting deceleration in core engine speed, fan speed, and thrust output would correspond essentially to those described in connection with the acceleration of the engine.

While a preferred embodiment of the present invention employing known components has been described, it will be apparent that variations therefrom will be recognized by those skilled in the art and the scope of the invention is therefore to be derived from the following claims.

Having thus described the invention, what is claimed as novel and desired to be secured by Letters Patent of the United States is:

1. A control system for a gas turbine engine comprising,
    means for changing the power output of the engine,
    means responsive to relatively small differentials between desired and actual power outputs for controlling the power changing means as a function of such differential,
    means, operative upon the differential between actual and desired power exceeding a given relatively small differential, for controlling the power changing means at a maximum rate consistent with safe operation of the engine to obtain said desired power output, said maximum rate control means being operative until the desired power output has been at least substantially reached, and
    means for removing said maximum rate control means and substituting said differential controlling means as the means for controlling operation of the power changing means upon the power output having been changed to a desired value at a maximum rate.

2. A control system as in claim 1 adapted for a gas turbine engine having a compressor with a rotor, the speed of which indicates the thrust power output of the engine, said system further comprising,
    means for generating a signal indicating engine rotor speed,
    means for generating a demand signal indicating a desired rotor speed and thrust output,
    means for comparing said signals and generating an error signal indicating the difference therebetween,
    the differential controlling means are a function of said error signal,
    the maximum rate controlling means are operative upon the error signal exceeding a given value, and
    the removing and substituting means are operative upon the error signal reaching substantially a zero value.

3. A control system as in claim 2 wherein,
    the power changing means comprise means for controlling the rate of fuel flow to the engine, operative in response to a control signal applied thereto,
    the two controlling means and the removing and substituting means comprise,
    a latching circuit to which the error signal is fed, the output of said latching circuit being directly proportional to the error signal until a predetermined magnitude is reached whereupon the latching circuit output is increased to a maximum value which is maintained until the error signal is reduced to zero whereupon the output is again proportional to the input,
    means responsive to at least one engine operating parameter for generating a signal indicating the maximum rate at which fuel control means can be varied consistent with safe operation of the engine,
    means for applying the latching circuit output as the control signal when it is proportional to the error signal and applying the maximum rate signal as the control signal to the fuel control means when the latching circuit output is at its maximum value.

4. A control circuit as in claim 3 wherein,
    the maximum rate signal is at all times greater than a proportional output from said latching circuit and said maximum output of the latching circuit is greater than any maximum rate signal, and said applying means comprise selector means to which the latching circuit output and the maximum rate signal are fed, said selector means passing the input signal of lower absolute value to the fuel control means as the control signal therefor.

5. A control circuit as in claim 4 wherein, the comparing means provide an error signal having a polarity indicating overspeed or underspeed of the compressor rotor dependent on the relative values of the actual speed and demand signals, the latching circuit output reflects the polarity of the error signal, the maximum rate signal is of one polarity and indicates the maximum rate at which fuel flow can be increased to accelerate the engine, means responsive to at least one engine operating parameter are provided for generating a signal indicating the maximum rate at which fuel flow can be reduced to decelerate the engine in a safe fashion, the polarity of the deceleration signal being opposite that of the acceleration signal having an absolute value greater than the absolute value of the latching circuit proportional output and less than the maximum absolute value of the latching circuit output, and said latching circuit comprises a small signal selector to which the positive maximum rate signal is fed and a large signal selector to which the negative maximum rate signal is fed, said latching circuit output being fed to one of said selectors and both selectors being interconnected whereby the control signal will have a polarity causing an increase or decrease of fuel dependent on whether acceleration or deceleration is desired.

References Cited

UNITED STATES PATENTS 3,295,316   1/1967   Beatrice et al. _____ 60—39.28.

JULIUS E. WEST, *Primary Examiner.*

UNITED STATES PATENT OFFICE
CERTIFICATE OF CORRECTION

Patent No. 3,357,177                      December 12, 1967

Jack E. Cornett

It is hereby certified that error appears in the above numbered patent requiring correction and that the said Letters Patent should read as corrected below.

Column 8, line 2, after "signal" insert -- and --.

Signed and sealed this 21st day of January 1969.

(SEAL)
Attest:

Edward M. Fletcher, Jr.                      EDWARD J. BRENNER
Attesting Officer                              Commissioner of Patents